United States Patent
Rakshit

(10) Patent No.: US 10,219,075 B2
(45) Date of Patent: Feb. 26, 2019

(54) METHOD AND SYSTEM FOR SPEAKER ARRAY ASSEMBLY AND POROUS DISPLAY DEVICE

(71) Applicant: International Business Machines Corporation, Armonk, NY (US)

(72) Inventor: Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/606,009

(22) Filed: May 26, 2017

(65) Prior Publication Data

US 2018/0343519 A1 Nov. 29, 2018

(51) Int. Cl.
| | |
|---|---|
| *H04S 7/00* | (2006.01) |
| *H04R 3/12* | (2006.01) |
| *H04R 1/40* | (2006.01) |
| *G06F 3/0481* | (2013.01) |
| *H04R 29/00* | (2006.01) |
| *H04R 1/02* | (2006.01) |

(52) U.S. Cl.
CPC ............ *H04R 3/12* (2013.01); *G06F 3/0481* (2013.01); *H04R 1/028* (2013.01); *H04R 1/403* (2013.01); *H04R 29/002* (2013.01); *H04R 29/007* (2013.01); *H04S 7/308* (2013.01)

(58) Field of Classification Search
CPC .......... H04R 1/028; H04R 1/18; H04R 1/025; H04R 29/007; H04R 1/403; G06F 3/0481; G06F 1/1605; H04S 7/308
USPC ...................... 381/58, 388, 59, 123
See application file for complete search history.

(56) References Cited

U.S. PATENT DOCUMENTS

| | | | |
|---|---|---|---|
| 8,078,239 B2 | 12/2011 | Numano et al. | |
| 9,030,386 B2 | 5/2015 | Park | |
| 2010/0172214 A1* | 7/2010 | Qian | H04R 23/002 367/140 |
| 2012/0149437 A1 | 6/2012 | Zurek et al. | |
| 2014/0099992 A1* | 4/2014 | Burns | G06F 3/044 455/550.1 |
| 2014/0152890 A1* | 6/2014 | Rayner | G06F 1/1626 348/376 |

(Continued)

OTHER PUBLICATIONS

Pardo, Bryan, "Tunebot" link: http://music.cs.northwestern.edu/research/php; printed Mar. 27, 2017; 6 pages.

(Continued)

*Primary Examiner* — Vivian Chin
*Assistant Examiner* — Ubachukwu Odunukwe
(74) *Attorney, Agent, or Firm* — George R. McGuire; Bond Schoeneck & King, PLLC; John Pivnichny

(57) ABSTRACT

The disclosure is directed to a device that includes a multi-layered porous display that permits the passage of sound through the display, while avoiding dead-spots that produce no light. Embodiments of the invention include a display that has first porous layer overlaying a second porous layer. The pores of each layer do not align so that light cannot pass directly through pores of each layer. In this way, a user may not view the pores of the second layer through the pores of the first layer. Further, because the first layer is backed by a second layer, the image displayed will be viewable through the pores of the first layer and, thus, a user will not perceive the pores of the first layer.

15 Claims, 5 Drawing Sheets

(56) References Cited

U.S. PATENT DOCUMENTS

| | | | |
|---|---|---|---|
| 2014/0183269 A1* | 7/2014 | Glaser | G06F 21/32 |
| | | | 235/492 |
| 2015/0016648 A1* | 1/2015 | Kazemzadeh | H04R 25/652 |
| | | | 381/325 |
| 2015/0049899 A1* | 2/2015 | Mellow | G06F 1/1605 |
| | | | 381/388 |
| 2015/0070752 A1 | 3/2015 | Sadlik et al. | |
| 2016/0139702 A1* | 5/2016 | Franklin | G06F 3/044 |
| | | | 345/174 |
| 2016/0277843 A1* | 9/2016 | Babayoff | H04R 17/005 |

OTHER PUBLICATIONS

Waltrs, Ray, "Motorola wants to turn your mobile phone's display into a speaker", link: http:extremetech.com/mobile/131145-motorola-mobile-display-into-a-speaker; printed Mar. 27, 2017; 5 pages.

Reisinger, Don, "Gadget screen as speaker, too? Motorola wants to make it so"; link: https://www.cnet.com/news/gadget-screen-as-speaker-too-motorola-wants-to-make-it-so/; printed Mar. 27, 2017; 3 pages.

Matsuoka, "Blind Separation of Sounds Prince Shotoku Project", Research Frontiers, Kyushu Institute of Technology, dated Nov. 26, 2014; 2 pages.

\* cited by examiner

METHOD AND SYSTEM FOR SPEAKER ARRAY ASSEMBLY AND POROUS DISPLAY DEVICE

BACKGROUND

The present invention relates to speakers, and more specifically, to a speaker array assembly positioned to emit sound through a multi-layered porous display.

As mobile devices increase in size, the relative size of the speaker hole becomes smaller and smaller. This means that when a user holds the device to his or her ear, there is a smaller chance that the user will hold the speaker to his or her ear. Frequently, a user places the screen of the device, rather than the speaker, against his or her ear, muffling the sound and forcing the user to readjust the device so that he or she can hear.

One solution to this problem is to place the speaker behind a porous, acoustically-permeable screen. In this configuration, the sound emanates directly from the screen, eliminating the need for a speaker hole on the face of the device. But these pores are visible to a user, creating dead-spots in the screen that do not produce any light. A user looking at the dead-spot-covered screen will be undesirably distracted by the points on the screen that do not display the image.

Accordingly, there is a need in the art for an acoustically-permeable screen that does not create unsightly dead-spots.

SUMMARY

The disclosure is directed to a device that includes a multi-layered porous display that permits the passage of sound through the display, while avoiding dead-spots that produce no light. Embodiments of the invention include a display that has first porous layer overlaying a second porous layer. The pores of each layer do not align so that light cannot pass directly through pores of each layer. In this way, a user may not view the pores of the second layer through the pores of the first layer. Further, because the first layer is backed by a second layer, the image displayed will be viewable through the pores of the first layer and, thus, a user will not perceive the pores of the first layer.

According to an aspect, a device includes an acoustically-permeable display, comprising: a first layer defining a first plurality of pores, each of the first plurality of pores being configured to permit the passage of sound through the first layer; a second layer defining a second plurality of pores, each of the second plurality of pores being configured to permit the passage of sound through the second layer, wherein the second layer overlays the first layer, defining a gap between the first layer and the second layer, wherein each pore of the first plurality of pores is unaligned with respect to each pore of the second plurality of pores such that light may not pass directly through both a pore of the first plurality of pores and a pore of the second plurality of pores.

According to an embodiment, the device further includes a plurality of speakers arranged in an array, each of the plurality of speakers being positioned and oriented to direct sound through at least one portion of the acoustically-permeable display different from at least one other speaker of the plurality of speakers.

According to an embodiment, the acoustically-permeable display includes at least one partition, extending across the gap between the first layer and the second layer such that the acoustically-permeable display is divided into a plurality of acoustically-insulated portions.

According to an embodiment, the device further includes a controller, configured to: identify a portion of the acoustically-permeable display according to a sensor signal representing contour of a user's ear in contact with the acoustically-permeable display; and determine which speaker of the plurality of speakers is positioned and oriented to direct sound through the identified portion of the acoustically-permeable display.

According to an embodiment, the controller is further configured to transmit an audio signal to the speaker positioned and oriented to direct sound through the portion of the acoustically-permeable display in contact with the user's ear.

According to an embodiment, the controller is further configured to predict, from the identified contour, the location of the user's interior ear with respect to the acoustically-permeable display.

According to an embodiment, the device further includes a sensor configured to sense the contour of a user's ear.

According to an embodiment, the device further includes a controller, the controller configured to: analyze image data to identify a portion of the image data to associate with an audio signal, wherein the image data represents an image displayed on the acoustically-permeable display and the portion of the image data represents a portion of the image displayed on a portion of the acoustically-permeable display; determine which speaker of the plurality of speakers is positioned and oriented to direct sound through the portion of the acoustically-permeable display displaying the portion of the displayed image.

According to an embodiment, the controller is further configured to transmit an audio signal to the speaker of the plurality of speakers positioned and oriented to direct sound through the portion of the acoustically-permeable display displaying the portion of the displayed image.

According to an embodiment, the controller is configured to receive an input from a user identifying the portion of the image data to associate with the audio signal.

According to another aspect, a method includes the steps of: providing an acoustically-permeable screen and a plurality of speakers arranged in an array, each of the plurality of speakers being positioned and oriented to direct sound through at least one portion of the acoustically-permeable display different from at least one other speaker of the plurality of speakers; identifying a portion of the acoustically-permeable display according to a sensor signal representing contour of a user's ear in contact with the acoustically-permeable display; and determining which speaker of the plurality of speakers is positioned and oriented to direct sound through the identified portion of the acoustically-permeable display.

According to an embodiment, the method further includes the step of transmitting an audio signal to at least one speaker of the plurality of speakers positioned and oriented to direct sound through the identified portion of the acoustically-permeable display.

According to an embodiment, the method further includes the step of predicting, from the identified contour, the location of the user's interior ear with respect to the acoustically-permeable display.

According to an embodiment, the acoustically-permeable screen comprises a first layer defining a first plurality of pores, each of the first plurality of pores being configured to permit the passage of sound through the first layer; a second layer defining a second plurality of pores, each of the second plurality of pores being configured to permit the passage of sound through the second layer, wherein the second layer overlays the first layer, defining a gap between the first layer and the second layer, wherein each pore of the first plurality of pores is unaligned with respect to each pore of the second plurality of pores such that light may not pass directly through both a pore of the first plurality of pores and a pore of the second plurality of pores.

According to an embodiment, the acoustically-permeable display includes at least one partition, extending across the gap between the first layer and the second layer such that the acoustically-permeable display is divided into a plurality of acoustically-insulated portions.

According to another aspect, a method includes the steps of: providing an acoustically-permeable screen and a plurality of speakers arranged in an array, each of the plurality of speakers being positioned and oriented to direct sound through at least one portion of the acoustically-permeable display different from at least one other speaker of the plurality of speakers; analyzing image data to identify a portion of the image data to associate with an audio signal, wherein the image data represents an image displayed on the acoustically-permeable display and the portion of the image data represents a portion of the image displayed on a portion of the acoustically-permeable display; determining which speaker of the plurality of speakers is positioned and oriented to direct sound through the portion of the acoustically-permeable display displaying the portion of the displayed image.

According to an embodiment, the method further includes the step of transmitting an audio signal to the speaker of the plurality of speakers positioned and oriented to direct sound through the portion of the acoustically-permeable display displaying the portion of the displayed image.

According to an embodiment, the method further includes the step of receiving an input from a user identifying the portion of the image data to associate with the audio signal.

According to an embodiment, the acoustically-permeable screen comprises a first layer defining a first plurality of pores, each of the first plurality of pores being configured to permit the passage of sound through the first layer; a second layer defining a second plurality of pores, each of the second plurality of pores being configured to permit the passage of sound through the second layer, wherein the second layer overlays the first layer, defining a gap between the first layer and the second layer, wherein each pore of the first plurality of pores is unaligned with respect to each pore of the second plurality of pores such that light may not pass directly through both a pore of the first plurality of pores and a pore of the second plurality of pores.

According to an embodiment, the acoustically-permeable display includes at least one partition, extending across the gap between the first layer and the second layer such that the acoustically-permeable display is divided into a plurality of acoustically-insulated portions.

These and other aspects of the invention will be apparent from the embodiments described below.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

The present disclosure is directed to embodiments of a method and system for transmitting sound through an acoustically-permeable display.

Figure 1:
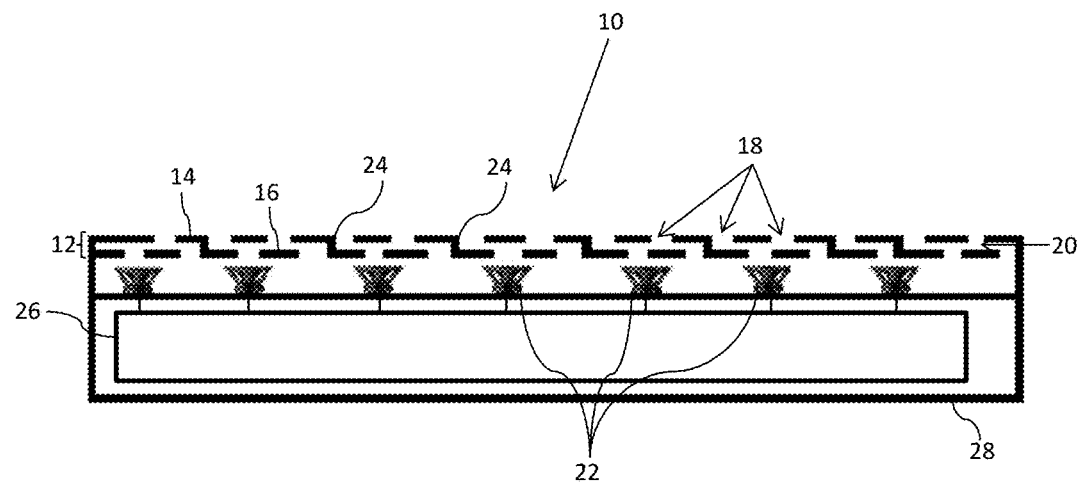
FIG. 1 shows a cross section view of acoustically-permeable display device according to an embodiment.

FIG. 1 depicts a cross-sectional view of a device 10 including an acoustically-permeable display 12 according to an embodiment. In the embodiment shown, acoustically permeable display 12 may be comprised of two layers 14, 16. Each layer 14, 16 may further define a plurality of pores 18, such that the first layer 14 has a first plurality of pores and the second layer 16 has a second plurality of pores. Each pore of each layer extends through the layer—i.e., from one surface of the layer to another—such that sound may be transmitted through the layer. In other words, each pore of the first layer is configured to permit the passage of sound through the first layer and each pore of the second layer is configured to permit the passage of sound through the second layer.

Figure 2A:
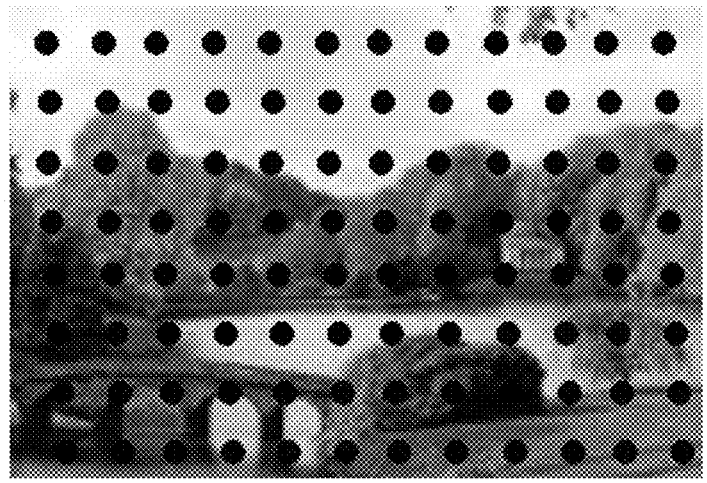
FIG. 2A shows a single-layer porous display according to an embodiment.
Figure 2B:
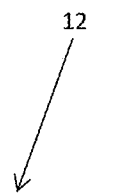
FIG. 2B shows a multi-layer porous display according to an embodiment.
Figure 2B:

In an embodiment, each pore of the first layer is unaligned with each pore of the second layer such that light may not pass directly through both a pore of the first layer and a pore of the second layer. Here, passing directly through a pore of the first layer and a pore of the second layer means passing from one pore to the next pore in a straight line, without reflection or refraction. The overlapping layers and unaligned pores result in a display with pores that do not show when display 12 is displaying an image. For contrast, FIG. 2A depicts a single-layer display with pores. Because the pores have no backing, no image is displayed through the pores when the single-layer display is turned on. This means that the pores are seen as dead-spots—e.g., black dots—on the single-layer display. FIG. 2B depicts the, double-layer porous display 12. Because each pore of the first layer is backed by the second layer which depicts the same image, the pores are not seen by a user—the image still shines through the pores. This is represented in FIG. 2B as filled-in circles. The pores in FIGS. 2A and 2B have been enlarged to depict the problem with a single-layer display. Of course, when implemented, the pores of the double-layer display 12 will not be visible to a viewer.

As shown in FIG. 1, the first layer 14 of display, according to an embodiment, overlays and extends in a plane parallel to the plane of the second layer 16. The first layer 14 further defines a gap 20 between the first layer 14 and second layer 16. This gap 20 permits sound generated from one side of display 12 to pass through both layers 14, 16, to other side of the layers 14, 16. Sound travels first through the pores of the second layer 16, then through the gap 20, and finally through pores of the first layer 14. Because the pores of the first layer 14 and second layer 16 are unaligned, without gap 20, sound is not able to pass from one side of display 12 to the other.

One of ordinary skill—in conjunction with a review of this disclosure—will appreciate that the pores 18 may take any shape that permits sound to pass through the respective layer. For example, the pores 18 may have walls that form a cylinder, or may be funnel-shaped. The pores 18 also need not all direct sound in a direction normal to the surface of the respective layer. For example, some pores 18 of the first layer 14 may direct sound at an angle, such as toward the bottom of the first layer 14, while others may direct sound in a direction normal to the surface of the layer.

As shown in FIG. 1, an array of speaker array 22 may be positioned behind display 12. Each speaker of the array 22 may be positioned and oriented to direct sound through the acoustically permeable display 12. Further, each speaker of speaker array 22 may be positioned and oriented to direct sound through a portion of the acoustically permeable display 12 different from at least one other speaker of the array of speaker array 22. For example, one or more speakers of speaker array 22 may direct sound through one half of the acoustically permeable display 12, while one or more speakers of speaker array 22 may direct sound through the other half of the acoustically permeable display 12. Of course, a speaker of speaker array 22 need not direct sound through only one half, but may, depending on the size and location of the speaker, direct sound through smaller or larger portions of display 12. For example, a speaker of speaker array 22 may direct sound through a quarter of the display, an eighth and so on. The size of the portion of the display through which a speaker transmits sound will depend on the size and power of the speaker as well as the distance from the speaker to the display 12.

Speaker array 22 may be comprised of traditional passive speakers, powered speakers, speakers formed from carbon nanotubes, or any other speaker capable of producing an audio signal through the acoustically-permeable display 12. Speakers formed from carbon nanotubes may be particularly suited for positioning within a mobile device because they are thin and easily fit behind a display.

Further, the acoustically-permeable display 12 may have two or more acoustically-insulated portions. For example, one half of acoustically-permeable display 12 may be acoustically insulated from the other half of display 12. This may be accomplished by partitions 24 that extend between the first layer 14 and the second layer 16, through gap 20. Partitions 24 may seal a portion of gap 20 such that sound passing between the layers is prevented from traversing from one portion to the other. For example, one or more partitions 24 may isolate the pores 18 of one half of display 12 from the pores 18 of the other half of display 12. The result being that the sound emitted by a speaker closely positioned behind one half of the display will only pass through the pores 18 of that half, and will not traverse through to the other half. Of course, the display 12 may be divided into more than two insulated portions—display 12 may be divided into any number of insulated portions, according to the number and position of the partitions 24 between the layers 14, 16.

Device 10 may further comprise a controller configured to transmit one signal to at least one speaker of the array of speaker array 22 and another signal to at least one (different) speaker of the array of speaker array 22. In this way, controller 26 may cause one speaker to produce one sound and another speaker to produce another sound. If the first speaker is configured to direct sound through one portion of display 12 and the other is configured to produce sound through another portion of display 12, then controller 26 by directing different audio signals to the different speakers, may cause different sounds to be emitted from different portions of the display.

One of ordinary skill will appreciate—in conjunction with a review of this disclosure—that controller 26 may be implemented by at least one processor and at least one nontransitory storage medium configured to store program code to be executed on the processor. The processor may be any processor suited to carry out the steps (e.g., programs) and methods described in this disclosure. Controller 26 may, for example, be implemented by a microcontroller or a general purpose processor in communication with the non-transitory storage medium. Further, controller 26 may be implemented by more than one processor, and with more than one storage mediums. For example, controller 26 may be implemented by several microcontrollers or several other processors operating together. Further, controller 26 need not necessarily be directly connected to any speaker, but may instead be connected to an intermediary circuit, such as a driver that amplifies the signal from controller 26.

As shown in FIG. 1, in an embodiment, display 12 may be affixed to or part of a housing 28, which may also contain speaker array 22 and controller 26. Housing 28 may be, for example, the body of a mobile device such a smart phone or tablet, or may be the body of a larger device such as a laptop, desktop computer, or television. Further, the body may be completely sealed and closed, or may be open on side. For example, display may be set in the wall of a house or building—in this context, the wall may be considered the body that hosts display and contains the various components that drive the display.

Figure 3:
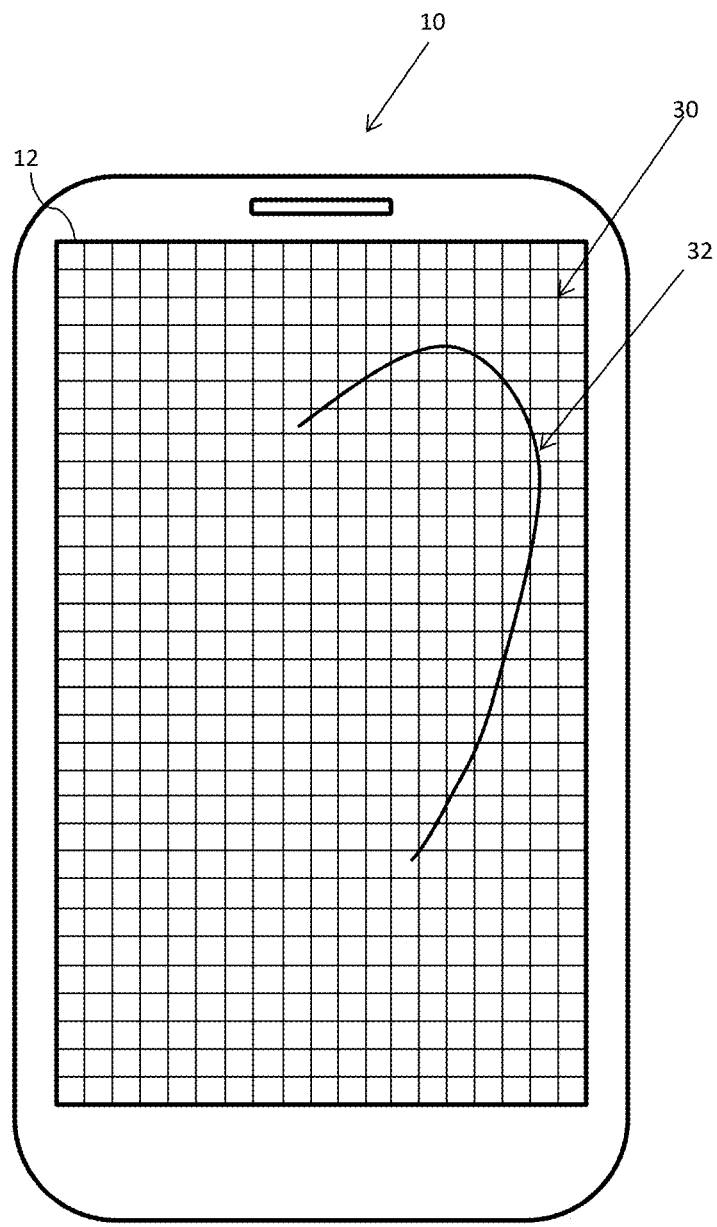
FIG. 3 shows an acoustically-permeable display according to an embodiment.

Controller 26 may be configured to store program code for directing audio through a portion 12 of display that is in contact with or near to the user's ear. As shown in FIG. 3, device 10 may further include sensor 30 (represented in FIG. 3 as a grid of capacitors) which is configured to sense a user's touch. In an embodiment, sensor 30 may be a capacitive touch sensor. Controller 26 may be configured to receive from sensor 30 input data and to interpret the received input data.

In an embodiment, controller may be configured to identify the contour 32, or other shape representing a user's ear, in contact with display 12. For example, if sensor 30 is a capacitive touch sensor, it will be comprised of a plurality of capacitors, usually arranged in a predetermined configuration such as a grid. Although different kinds of capacitive touch sensors exist, capacitive touch sensors frequently detect a change in capacitance—induced by a user's touch—of one or more capacitors in a grid of capacitors. Controller 26 may be configured to identify a change in the capacitances of a particular pattern of capacitors within the grid. For example, controller 26 may be configured to identify a change of capacitance in an arc of capacitors within the grid. One of ordinary skill will appreciate that different types of capacitive touch sensors, and different types of sensors may be used.

Once contour 32 of a user's has been sensed by sensor 30 and identified by controller 24, controller 24 may identify a portion of the acoustically-permeable display 12 according to the sensed contour 32. In an embodiment, controller 24 may identify a portion of display 12 relative to the position of contour 32. In an embodiment, the identified portion of the display 12 may be, or surround, a point along contour 32. In an alternate embodiment, the identified portion of the display 12 may be a portion located in an area located within or a predetermined distance from contour 32. Because a user does not hear with the portion of the ear that is often in contact with the display (i.e. the outer perimeter of the ear), it may be useful to direct the sound through a portion of display closer to the user's interior ear. (For the purposes of this disclosure, the user's interior ear is any portion of the ear defined or outlined by the outer perimeter of the ear and may include external portions of the ear, the ear canal, and the inner ear.) For example, using standard or average distances from the edge of the ear to the ear canal and the location and orientation of the edge of the user's ear—determined from the sensed contour 32 of the user's ear—controller may approximate the location of the user's interior ear with respect to display 12.

Once a portion of display 12 is identified, controller 26 may determine which speaker of the plurality of speakers is positioned and oriented to direct sound through the identified portion of display 12. By positioning the array of speaker array 22 behind display 12 as described each portion of display 12 may be mapped to one or more speakers of the array 22. For example, each portion may be mapped to the speaker nearest to the portion or, alternately, to each speaker capable of transmitting sound through the portion. In some instances, if a portion is equidistant, or otherwise near to more than one speaker (e.g., such as within a predetermined distance), the portion may be associated with each speaker that the point is near. For example, if a portion is located directly over one speaker of the array, the portion may be associated with that speaker. If a portion is located between two or more speakers, the portion may be mapped to the speakers it is between.

In an embodiment, controller 26, using a non-transitory storage medium, may store this mapping as a lookup table. The mapping may take into account, for example, partitions 24 that create insulated portions of display 12. Thus, if one speaker is near to the identified portion, but is otherwise insulated from producing sound that may reach that point, that speaker will not be mapped to that point or portion of the display. By consulting the lookup table, or by otherwise accessing a mapping of speakers to points or portions of display, controller 26 may determine which speaker of the plurality of speakers is positioned and oriented to direct sound through the identified portion of display 12.

Once the location of the user's ear or interior ear with respect to display 12 is identified, and controller 26 determines which speaker or speakers of the speaker array 22 are positioned and oriented to project sound through the identified portion of display 12, controller may transmit an audio signal to the one or more speakers determined. This audio signal may, for example, be a phone call or voicemail message. In alternate embodiment, controller 26 may transmit the audio signal to each speaker of the array of speaker array 22, but may amplify the signal of the speaker or speakers identified as near to the user's ear.

Figure 4:
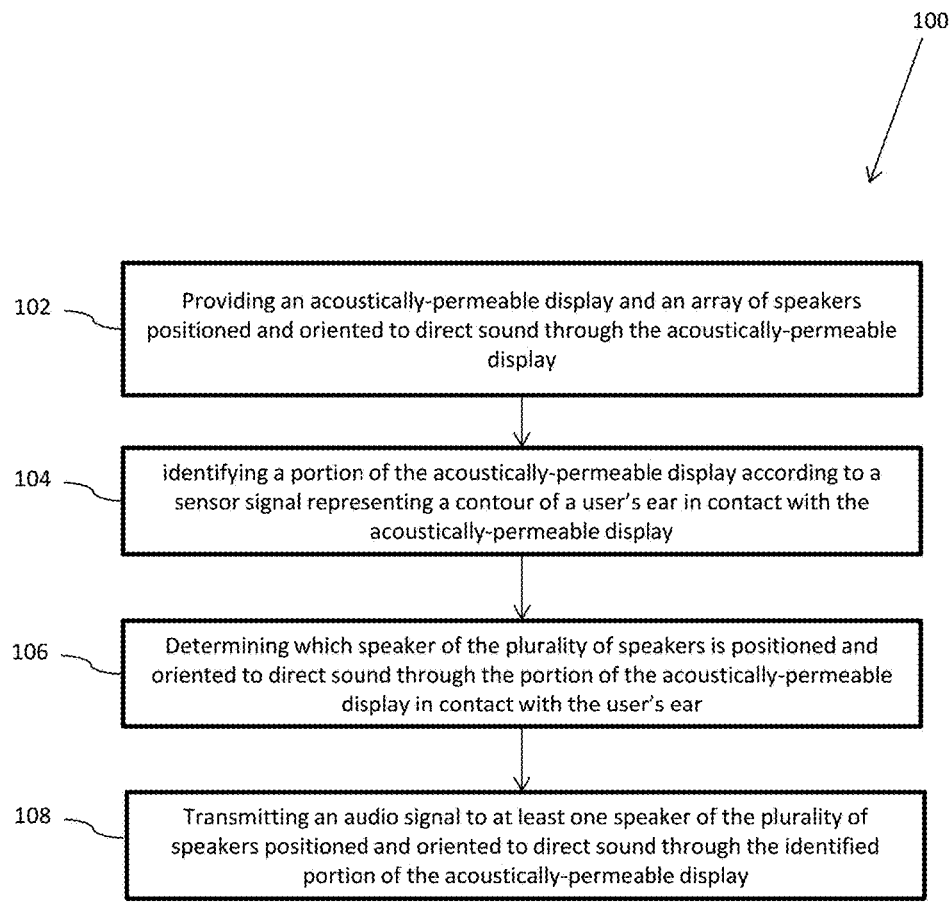
FIG. 4 shows a flowchart of a method for directing an audio signal to a user's ear in contact with display according to an embodiment.

FIG. 4 shows a flowchart of a method 100 for identifying the position of a user's ear relative to the acoustically-permeable display and for transmitting an audio signal through the acoustically-permeable, directed at the user's ear.

At step 102, an acoustically-permeable screen and a plurality of speakers arranged in an array are provided. This acoustically-permeable screen may, in an embodiment, be acoustically-permeable screen 12 described in this disclosure or it may be another acoustically-permeable screen. Similarly, the plurality of speakers may be the speaker array 22, described elsewhere in this disclosure. In any instance, each of the plurality of speakers is positioned and oriented to direct sound through at least one portion of the acoustically-permeable display different from at least one other speaker of the plurality of speakers.

The remaining steps of method 100 may be accomplished by a controller, such as controller 26, in communication with the plurality of speakers, and configured to receive a value from a sensor, such as sensor 30.

At step 104, a portion of the acoustically-permeable display is identified according to a sensor signal representing a contour of a user's ear in contact with the acoustically-permeable display. A first part of this step is identifying a contour of a user's ear in contact with display 12. This may be accomplished, for example, using a capacitive-touch sensor. As described above, a capacitive touch sensor may be comprised of a plurality of capacitors, usually arranged in a predetermined configuration such as a grid. Although different kinds of capacitive touch sensors exist, capacitive touch sensors frequently detect a change in capacitance—induced by a user's touch—of one or more capacitors in a grid of capacitors. Changing capacitances of a particular pattern within the grid may be identified. For example, a change of capacitance of an arc of capacitors within the grid may be identified, representing the outline of a user's ear in contact with the acoustically-permeable display. One of ordinary skill will appreciate that different types of capacitive touch sensors, and different types of sensors may be used.

The second part of step 104 is identifying a portion of the acoustically-permeable display according to the sensed contour. In an embodiment, the portion may be identified relative to the position of the contour. In an embodiment, the identified portion of the display may be, or surround, a point along the sensed contour. In an alternate embodiment, the identified portion of the display may be a portion located in an area located within or a predetermined distance from contour. Because a user does not hear with the portion of the ear that is often in contact with the display (i.e. the outer perimeter of the ear), it may be useful to direct the sound through a portion of display closer to the user's interior ear. (For the purposes of this disclosure, the user's interior ear is any portion of the ear defined or outlined by the outer perimeter of the ear and may include external portions of the ear, the ear canal, and the inner ear.) For example, using standard or average distances from the edge of the ear to the ear canal and the location and orientation of the edge of the user's ear—determined from the sensed contour of the user's ear—controller may approximate the location of the user's interior ear with respect to the display.

At step 106, it may be determined which speaker of the plurality of speakers is positioned and oriented to direct sound through the identified portion of the acoustically-permeable display. This step may be accomplished by first mapping each point on the acoustically-permeable display to one or more speakers of the array. For example, each point may be mapped to the speaker nearest to the point or, alternately, to each speaker capable of transmitting sound through the point. In some instances, if a point is equidistant, or otherwise near to more than one speaker (e.g., such as within a predetermined distance), the point may be associated with each speaker that the point is near. For example, if a point is located directly over one speaker of the array, the point may be associated with that speaker. If a point is located between two or more speakers, the point may be mapped to the speakers it is between. This mapping may be stored, for example, as a lookup table. By consulting the lookup table, or by otherwise accessing a mapping of speakers to points or portions of display, which speaker of the plurality of speakers may be positioned and oriented to direct sound through the identified portion of the acoustically-permeable display.

At step 108, an audio signal may be transmitted to at least one speaker of the plurality of speakers positioned and oriented to direct sound through the identified portion of the acoustically-permeable display.

Referring again to FIG. 1, in an embodiment, device 10 may be configured to identify an object displayed on display 12 as the representative source of an audio signal. For example, if a video is played on display 12, controller 26 may be configured to identify a character speaking in the video and direct audio signal to emanate from display 12 near character's mouth. This way, a viewer, watching the video depicting on display 12, perceives the sound of a character's voice coming from the characters mouth.

In this embodiment, controller 26 first analyzes image data to identify a portion of the image data to associate with an audio signal. The image data represents an image that is displayed on display 12. In conducting the analysis, controller 26 may identify within the image data, for example, a moving mouth representative of a character or person displayed on display 12 speaking. To do so, controller 26 may employ facial recognition software to identify the source of the sound. Alternatively, controller 26 may identify another quality of the data which would be indicative a source of sound. For example, controller 26 may identify the portion of the image data that would cause the pixels of display to change the fastest. One of ordinary skill in the art will appreciate—in conjunction with a review of this disclosure—that controller 26 may employ one of numerous methods in the art of identifying an object depicted on a screen as the representative source of an audio signal. One of ordinary skill will further appreciate that the image data may be analyzed before the image is displayed on display 12. For example, the image data may be processed directly before the image is displayed on display 12. Alternatively, the image may be analyzed in "real time" as it is displayed on the screen.

The identified portion of the image data represents a portion of the displayed image. Thus, the portion of the image data will be displayed on the portion of the screen. Controller 26 may be used to determine which speaker of the plurality of speakers is positioned and oriented to direct sound through the portion of the acoustically-permeable display displaying the portion of the displayed image.

As described above each portion of display 12 may be mapped to one or more speakers of the array 22. For example, each portion may be mapped to the speaker nearest to the portion or, alternately, to each speaker capable of transmitting sound through the portion. In some instances, if a portion is equidistant, or otherwise near to more than one speaker (e.g., such as within a predetermined distance), the portion may be associated with each speaker that the point is near. For example, if a portion is located directly over one speaker of the array, the portion may be associated with that speaker. If a portion is located between two or more speakers, the portion may be mapped to the speakers it is between.

In an embodiment, controller 26, using a non-transitory storage medium, may store this mapping as a lookup table. The mapping may take into account, for example, partitions 24 that create insulated portions of display 12. Thus, if one speaker is near to the identified portion, but is otherwise insulated from producing sound that may reach that point, that speaker will not be mapped to that point or portion of the display. By consulting the lookup table, or by otherwise accessing a mapping of speakers to points or portions of display, controller 26 may determine which speaker of the plurality of speakers is positioned and oriented to direct sound through the portion of display 12 that is displaying the identified portion of the image data.

Once controller 26 identifies the speaker or speakers of the speaker array that may transmit sound through the portion of display 12 that is displaying the identified portion of the image data, controller 26 may be transmit an audio signal to those speakers.

One of ordinary skill will appreciate that controller 26 may identify multiple image portions that may each have a different audio signal associated with them. Controller 26 may, therefore, transmit different audio signals to speakers associated with different portions of display 12 to give the appearance that multiple images or objects displayed on the screen are each producing their own sound.

Controller 26 may also be configured to allow a user to redirect the source of the audio signal. For example, using sensor 30, which may be a capacitive touch sensor, the user may touch the display to select the portion of the screen from which the audio should be emitted or where the user desires the audio to be emitted. Controller may redirect the audio to be emitted from this location. Controller 26 may save this user input to non-transitory storage medium for future plays. In this way, the controller may configure device to play the audio from the desired places.

Figure 5:
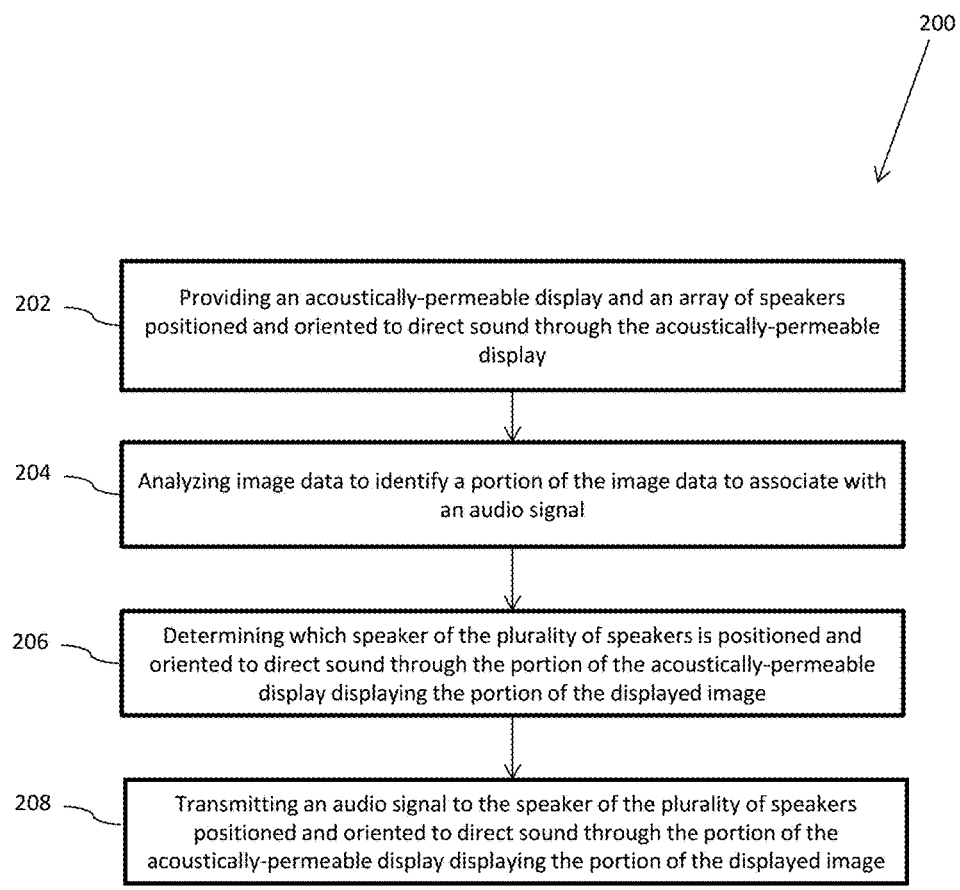
FIG. 5 shows a flowchart of a method for identifying an object displayed on display as a representative source of an audio signal.

FIG. 5 shows a flowchart of a method 200 for identifying an object displayed on display as the representative source of an audio signal.

At step 202, providing an acoustically-permeable display and an array of speakers positioned and oriented to direct sound through the acoustically-permeable display. This acoustically-permeable screen may, in an embodiment, be acoustically-permeable screen 12 described in this disclosure or it may be another acoustically-permeable screen. Similarly, plurality of speakers may be the speaker array 22, described elsewhere in this disclosure. In any instance, each of the plurality of speakers is positioned and oriented to direct sound through at least one portion of the acoustically-permeable display different from each other speaker of the plurality of speakers.

The remaining steps of method 200 may be accomplished by a controller, such as controller 26, in communication with the plurality of speakers, and configured to receive a value from a sensor, such as sensor 30.

At step 204, image data may be analyzed to identify a portion of the image data to associate with an audio signal. For example the image data may be analyzed to identify a moving mouth representative of a character or person, displayed on acoustically-permeable display, speaking. To do so, facial recognition software may be employed to identify a character's moving mouth. Alternatively, another quality of the image data may be identified that would be indicative a source of sound. For example, controller 26 may identify the portion of the image data that would cause the pixels of display to change the fastest. One of ordinary skill in the art will appreciate—in conjunction with a review of this disclosure—that any one of numerous methods in the art of identifying an object depicted on a screen as the representative source of an audio signal may be employed. One of ordinary skill will further appreciate that the image data may be analyzed before the image is displayed on the acoustically-permeable display. For example, the image data may be processed directly before the image is displayed on the acoustically-permeable display. Alternatively, the image may be analyzed in "real time" as it is displayed on the screen.

At step 206, determining which speaker of the plurality of speakers is positioned and oriented to direct sound through the portion of the acoustically-permeable display displaying the portion of the displayed image. This step may be accomplished by first mapping each point on the acoustically-permeable display to one or more speakers of the plurality of speakers. For example, each point may be mapped to the speaker nearest to the point or, alternately, to each speaker capable of transmitting sound through the point. In some instances, if a point is equidistant, or otherwise near to more than one speaker (e.g., such as within a predetermined distance), the point may be associated with each speaker that the point is near. For example, if a point is located directly over one speaker of the array, the point may be associated with that speaker. If a point is located between two or more speakers, the point may be mapped to the speakers it is between. This mapping may be stored, for example, as a lookup table. By consulting the lookup table, or by otherwise accessing a mapping of speakers to points or portions of display, which speaker of the plurality of speakers is positioned and oriented to direct sound through the portion of the acoustically-permeable display displaying the portion of the displayed image.

At step 208, transmitting an audio signal to the speaker of the plurality of speakers positioned and oriented to direct sound through the portion of the acoustically-permeable display displaying the portion of the displayed image.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A device, comprising:
    an acoustically-permeable display, comprising:
        a first layer defining a first plurality of pores, each of the first plurality of pores being configured to permit the passage of sound through the first layer;
        a second layer defining a second plurality of pores, each of the second plurality of pores being configured to permit the passage of sound through the second layer, wherein the second layer overlays the first layer, defining a gap between the first layer and the second layer, wherein each pore of the first plurality of pores is unaligned with respect to each pore of the second plurality of pores such that light may not pass directly through both a pore of the first plurality of pores and a pore of the second plurality of pores;
    a plurality of speakers arranged in an array, each of the plurality of speakers being positioned and oriented to direct sound through at least one portion of the acoustically-permeable display different from at least one other speaker of the plurality of speakers
    a controller configured to identify a portion of the acoustically-permeable display according to a sensor signal representing contour of a user's ear in contact with the acoustically-permeable display, and determine which speaker of the plurality of speakers is positioned and oriented to direct sound through the identified portion of the acoustically-permeable display
    wherein the controller is further configured to transmit an audio signal to the speaker positioned and oriented to direct sound through the portion of the acoustically-permeable display in contact with the user's ear; and
    wherein the controller is further configured to predict, from the identified contour, the location of the user's interior ear with respect to the acoustically-permeable display.

2. The device of claim 1, wherein the acoustically-permeable display includes at least one partition, extending across the gap between the first layer and the second layer such that the acoustically-permeable display is divided into a plurality of acoustically-insulated portions.

3. The device of claim 1, further comprising a sensor configured to sense the contour of a user's ear.

4. The device of claim 1, wherein the controller is further configured to:
    analyze image data to identify a portion of the image data to associate with an audio signal, wherein the image data represents an image displayed on the acoustically-permeable display and the portion of the image data represents a portion of the image displayed on a portion of the acoustically-permeable display;
    determine which speaker of the plurality of speakers is positioned and oriented to direct sound through the portion of the acoustically-permeable display displaying the portion of the displayed image.

5. The device of claim 4, wherein the controller is further configured to transmit an audio signal to the speaker of the plurality of speakers positioned and oriented to direct sound through the portion of the acoustically-permeable display displaying the portion of the displayed image.

6. The device of claim 1, wherein the controller is configured to receive an input from a user identifying the portion of the image data to associate with the audio signal.

7. A method, comprising the steps of:
    providing an acoustically-permeable screen and a plurality of speakers arranged in an array, each of the plurality of speakers being positioned and oriented to direct sound through at least one portion of the acoustically-permeable display different from at least one other speaker of the plurality of speakers;
    identifying a portion of the acoustically-permeable display according to a sensor signal representing contour of a user's ear in contact with the acoustically-permeable display;
    determining which speaker of the plurality of speakers is positioned and oriented to direct sound through the identified portion of the acoustically-permeable display; and
    predicting, from the identified contour, the location of the user's interior ear with respect to the acoustically-permeable display.

8. The method of claim 7, further comprising the step of transmitting an audio signal to at least one speaker of the plurality of speakers positioned and oriented to direct sound through the identified portion of the acoustically-permeable display.

9. The method of claim 7, wherein the acoustically-permeable screen comprises a first layer defining a first plurality of pores, each of the first plurality of pores being configured to permit the passage of sound through the first layer;
    a second layer defining a second plurality of pores, each of the second plurality of pores being configured to permit the passage of sound through the second layer, wherein the second layer overlays the first layer, defining a gap between the first layer and the second layer, wherein each pore of the first plurality of pores is unaligned with respect to each pore of the second plurality of pores such that light may not pass directly through both a pore of the first plurality of pores and a pore of the second plurality of pores.

10. The method of claim 7, wherein the acoustically-permeable display includes at least one partition, extending across the gap between the first layer and the second layer such that the acoustically-permeable display is divided into a plurality of acoustically-insulated portions.

11. A method, comprising the steps of:
    providing an acoustically-permeable display and a plurality of speakers arranged in an array, each of the plurality of speakers being positioned and oriented to direct sound through at least one portion of the acoustically-permeable display different from at least one other speaker of the plurality of speakers;

identifying a portion of the acoustically-permeable display according to a sensor signal representing contour of a user's ear in contact with the acoustically-permeable display;

analyzing image data to identify a portion of the image data to associate with an audio signal, wherein the image data represents an image displayed on the acoustically-permeable display and the portion of the image data represents a portion of the image displayed on a portion of the acoustically-permeable display;

determining which speaker of the plurality of speakers is positioned and oriented to direct sound through the portion of the acoustically-permeable display displaying the portion of the displayed image and predicting, from the identified contour, the location of the user's interior ear with respect to the acoustically-permeable display.

12. The method of claim 11, further comprising the step of transmitting an audio signal to the speaker of the plurality of speakers positioned and oriented to direct sound through the portion of the acoustically-permeable display displaying the portion of the displayed image.

13. The method of claim 11, further comprising the step of receiving an input from a user identifying the portion of the image data to associate with the audio signal.

14. The method of claim 11, wherein the acoustically-permeable screen comprises a first layer defining a first plurality of pores, each of the first plurality of pores being configured to permit the passage of sound through the first layer;

a second layer defining a second plurality of pores, each of the second plurality of pores being configured to permit the passage of sound through the second layer, wherein the second layer overlays the first layer, defining a gap between the first layer and the second layer, wherein each pore of the first plurality of pores is unaligned with respect to each pore of the second plurality of pores such that light may not pass directly through both a pore of the first plurality of pores and a pore of the second plurality of pores.

15. The method of claim 14, wherein the acoustically-permeable display includes at least one partition, extending across the gap between the first layer and the second layer such that the acoustically-permeable display is divided into a plurality of acoustically-insulated portions.

* * * * *